United States Patent [19]

Castaldi

[11] 3,840,131
[45] Oct. 8, 1974

[54] STORAGE AND RETRIEVAL SYSTEM

[75] Inventor: John A. Castaldi, Brooklyn, N.Y.

[73] Assignee: Supreme Equipment & Systems Corp., Brooklyn, N.Y.

[22] Filed: Dec. 11, 1972

[21] Appl. No.: 313,970

[52] U.S. Cl. .......................................... 214/16.4 A
[51] Int. Cl. .............................................. B65g 1/06
[58] Field of Search... 214/16.4 A, 16.4 B, 16.1 EB; 187/6, 9, 21, 27, 51, 56

[56] References Cited
UNITED STATES PATENTS

| | | | |
|---|---|---|---|
| 1,697,478 | 1/1929 | Sandberg | 187/9 |
| 2,511,619 | 6/1950 | Bowser | 214/16.1 EB |
| 3,018,903 | 1/1962 | Bianca | 214/16.1 EB |
| 3,526,326 | 9/1970 | Castaldi | 214/16.4 A |
| 3,592,348 | 7/1971 | Atwater | 214/16.4 A |
| 3,633,769 | 1/1972 | Dvbinsky et al. | 214/16.4 A |

FOREIGN PATENTS OR APPLICATIONS 1,547,586  10/1968  France .......................... 214/16.4 A

OTHER PUBLICATIONS

Cleveland Crane and Engineering Bulletin, No. 2039A, All pages, printed 1968.

*Primary Examiner*—Robert J. Spar
*Assistant Examiner*—R. B. Johnson
*Attorney, Agent, or Firm*—Sandoe, Hopgood and Calimafde

[57] ABSTRACT

The invention contemplates a particular carriage support and drive combination for use in storage systems for modular file boxes and the like, accommodated in horizontally accessible storage openings within a two-dimensional frame matrix. Two spaced rolls in the carriage chassis ride a first single lower rail to provide sole support of the carriage as well as the sole engagement for horizontal drive of the carriage. Lateral guide elements on the chassis engage the same single rail to provide longitudinal stabilizing action for the lower end of the carriage, and similar guide elements at the upper end of the carriage have similar stabilizing engagement with a second single rail, parallel to and directly above the lower rail.

2 Claims, 3 Drawing Figures

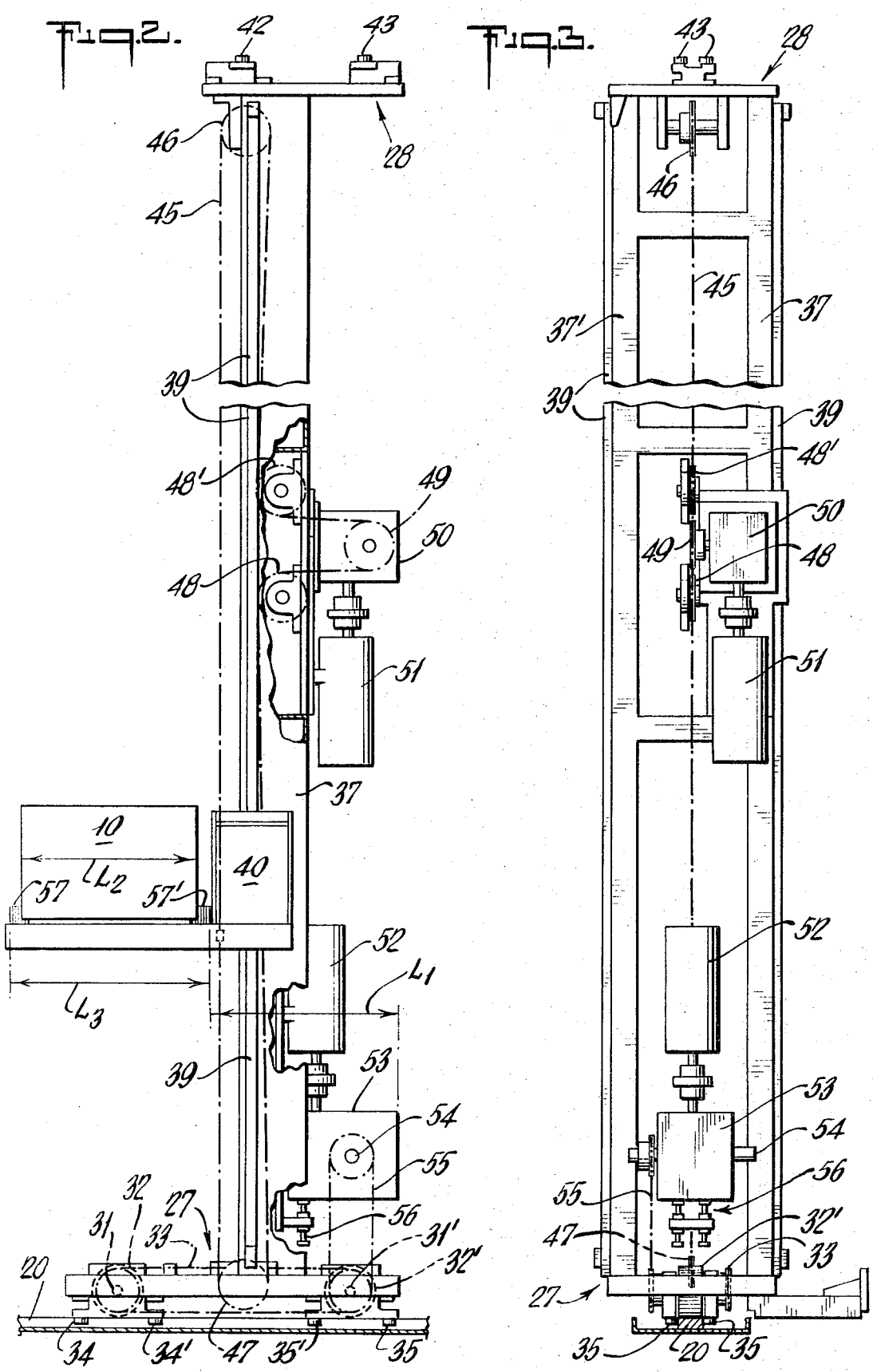

STORAGE AND RETRIEVAL SYSTEM

The invention relates to storage systems of the variety wherein modular file boxes or the like are stored and automatically retrieved from horizontally accessible storage openings or compartments within a two-dimensional frame matrix.

Systems of the character indicated are known from various patents, including Castaldi, U.S. Pat. No. 3,526,326. In such systems, a central arrangement of plural upper and lower rails accommodates a carriage frame which is caused to longitudinally course the space between two such storage matrices, with facing horizontal-access openings, and an elevator slide on the carriage provides a second component of access to these storage openings. To assure fidelity of access-opening registration, the carriage and carriage-support and drive mechanisms have been bulky, requiring as many as twelve rolling contacts above and below the carriage, quite aside from such additional contacts as are required for stabilization of longitudinal alignment. Also, the "dead space" required for basic carriage support and drive functions becomes a significant fraction of the storage capacity of the system, especially in smaller installations, as for small-office filing purposes.

It is an object of the invention to provide an improved construction of the character indicated and having particular application to amall-office use, as for example in a storage room which may previously have had to be considered a "dead-storage" room due to the inconvenience and difficulty of handling file boxes and the like.

Another object is to provide a relatively simple and reliable file and retrieval storage system, particularly applicable to efficient use of a given relatively small volumetric space for file or file-box storage.

A further object is to meet the above objects with a construction that leads itself to relatively simple maintenance.

It is also an object to achieve the above objects with a system which is rapid in its transport functions.

A specific object is to substantially simplify the primary support and drive mechanism of a storage system of the character indicated.

Other objects and various further features of novelty and invention will be pointed out or will occur to those skilled in the art from a reading of the following specification in conjunction with the accompanying drawings. In said drawings, which show, for illustrative purposes only, a preferred form of the invention:

FIG. 2 is a fragmentary side view in elevation of the carriage of FIG. 1; and

FIG. 3 is a rear-end view in elevation of the carriage of FIG. 1.

Figure 1:
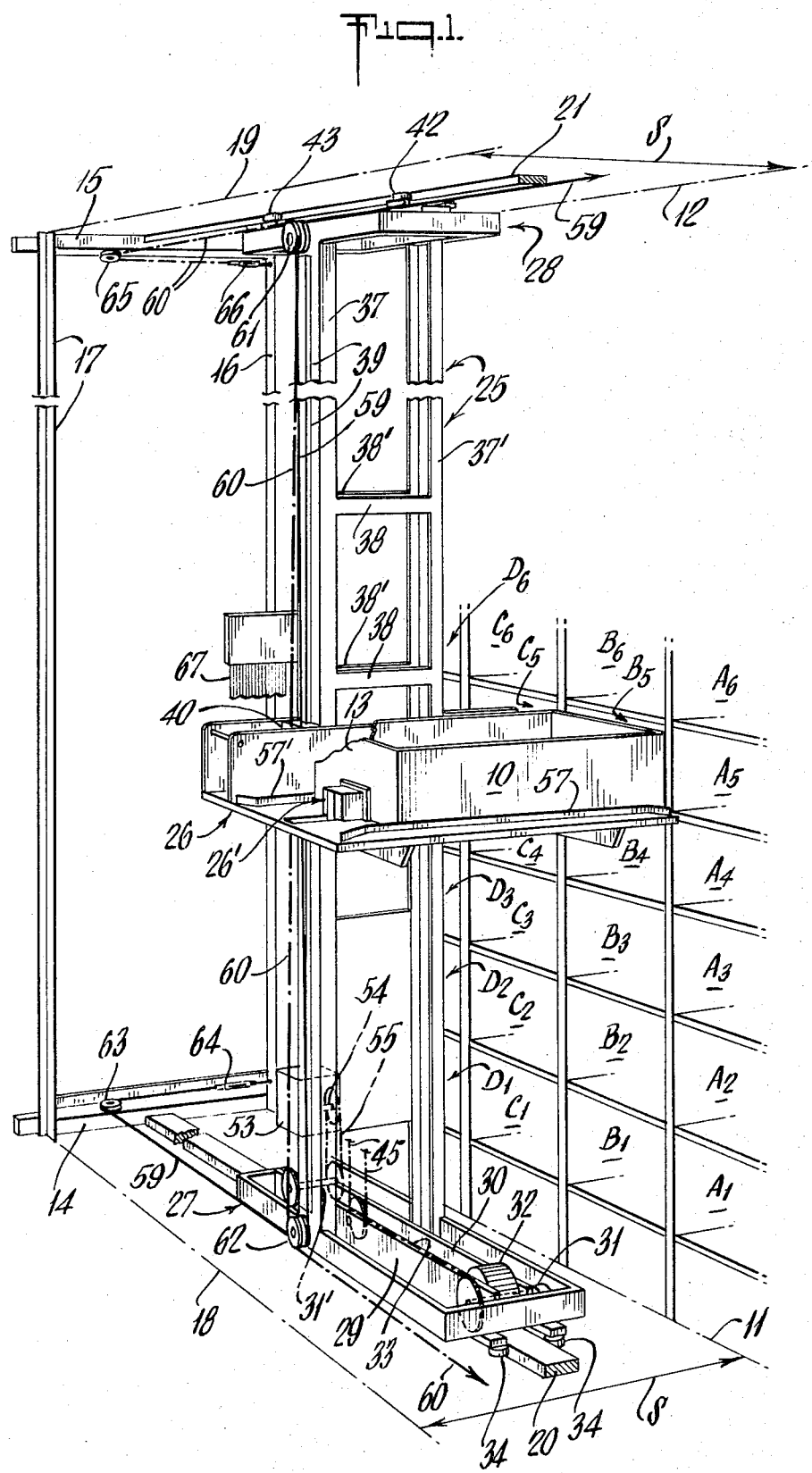
FIG. 1 is a simplified view in perspective of a storage and retrieval system of the invention, parts being broken-away and fragmentary, and the view being taken generally from the front, in terms of the longitudinal end at which retrieved-item access is available.

The invention is shown in application to storage and retrieval manipulation of modular units such as the file box or drawer 10, sized for accommodation in a selected one of a plurality of storage compartments within a two-dimensional frame matrix. As shown, the matrix is an array of like rectangular prismatic spaces accessible via open ends in a single vertical plane, the array being generally designated by numerical subscripts for the successive vertical levels of horizontally adjacent rows A-B-C-D, etc. Each storage compartment of the frame will be understood to include suitable means for the guided retention of an inserted container, insertable and retrievable endwise via the plane of the open ends, said plane being suggested in FIG. 1 by lower and upper parallel horizontal alignments 11-12, which may be at substantially floor and ceiling elevations of the available storage room. The depth of each storage compartment will be understood to be such that the exposed end wall of each stored container, such as the end wall 13 of container 10, lies substantially in or just inside the access plane 11-12 when stored; as shown, container 10 is aligned for accommodation within the storage compartment $B_5$.

Fixedly related to the described matrix of storage compartments is further framing, including lower and upper transverse horizontal members 14-15, extending between vertical members 16-17; member 16 may be a corner element of the described matrix, and member 17 may be a corner element of a second and similar matrix of further storage compartments having horizontal access openings in a single vertical plane, suggested by lower and upper horizontal alignments 18-19, parallel to the alignments 11-12, and spaced therefrom to the extent S. A single lower rail 20 and a single upper rail 21 are rigidly connected to end members (14-15, respectively) and are centrally positioned between the parallel vertical planes of access (11-12 and 18-19) to the respective storage-compartment matrices.

In accordance with a feature of the invention, the lower rail 20 provides total vertical support and longitudinal drive reference for a carriage 25 having a vertically positionable elevator platform 26 for accommodation of a given storage container 10 at any one time; a transversely driven actuator, for container-transfer to and from one of the storage matrices, is indicated at 26' and may be of the nature described in said Castaldi patent. The lower rail 20 provides an additional function of laterally stabilizing or guiding the carriage 25, and the upper rail 21 provides a similar stabilizing function for the upper end of carriage 25. As shown, both rails 20-21 are simple straight bars of rectangular section, the greater sectional dimension being preferably horizontal, so as to reduce vertical limitation on overall storage volume, and so as also to present a relatively wide flat upper horizontal surface at lower rail 20 for carriage-load distribution.

Carriage 25 comprises a single vertical column, united at its ends to elongated rectangular lower and upper horizontal chassis frames 27-28. Laterally spaced central longitudinal members 29-30 form part of the rigid lower chasis 27, providing firm journaled mounting of spaced shafts 31-31' for support rollers or wheels 32-32' at front and rear locations on the lower chassis. The two wheels 32-32' provide the entire vertical support and longitudinal drive engagement for carriage 25; they are thus equipped with relatively wide treads to substantially match the width of rail 20, and I prefer that, at least, the tread portion thereof shall be of suitable tough plastic, such as a circumferentially continuous tire of solid urethane, for long life and positive traction and braking efficiency. Wheels 32-32' are coupled for concurrent drive, as by an endless-chain connection 33 of sprockets locked to shafts 31-31'; provision for chain tensioning of a slidable front bearing mount is suggested at 33' (FIG. 2). For lateral-positioning stability, I provide front and back pairs of rolls, such as the front pair 34, depending from the chassis 27 on laterally spaced vertical axes, for guiding engagement with opposite lateral sides of rail 20. A similar pair of stabilizing or guide rolls 35 is provided at the rear end of chassis 27 and, if desired, such pairs may be further provided in duplicate, at 34' and 35' (see FIG. 2), for even further assurance of stable alignment.

The vertical column of carriage 25 is shown to comprise a single box girder consisting of upstanding channels 37–37', held in laterally spaced relation by spacers 38–38' which respectively connect front walls and rear walls of channels 37–37'. For economy of longitudinal space utilization, channels 37–37' are secured to chassis 27 rearwardly of the longitudinal center, as best seen in FIG. 2. Vertical elevator guides 39 characterize laterally outer channel surfaces, and elevator 26 includes guide-engaging blocks 40 riding the guides 39.

The upper chassis 28 may be of generally the construction of chassis 27 and of longitudinally lesser extent, it being noted that chassis 28 extends no further rearwardly of column channels 37' than does the lower chassis 27. The upper chassis 28 serves primarily to complete the rigid structural integrity of the entire frame of carriage 25 and to provide a mounting platform for longitudinally spaced pairs of upwardly projecting stabilizing guide rolls 42–43, for guidance from opposed lateral sides of the upper rail 21.

Elevator-positioning drive is accomplished via an endless sprocket chain 45, over upper and lower idler sprockets 46–47 at the respective chassis elevations; the front span of chain 45 is forward of the column connection members 38 and is locally secured to elevator 26, while the rear span is accommodated within the column girder, being coursed over closely spaced idler sprockets 48–48' and an adjacent drive sprocket 49, the latter being secured to the output shaft of reduction gearing means 50 by which it is reversibly driven by an electric motor 51. Both motor 51 and gear means 50 are mounted on the rear side of the carriage column, within the maximum rearward extent of the lower chassis 27, and the gear-reduction ratio at 50 is preferably relatively high (e.g., in the order of 40:1) in order that a selected elevator height may be effectively braked or held without resort to additional braking means, when a load is on the elevator platform. Preferably also, the selected mounting elevation of the vertical-drive elements 48 through 51 is such as to provide convenient accessibility for service maintenance, without requiring a stool, ladder or the like.

Below the vertical-drive mechanism (48 through 51), similar electric of horizontal-drive mechanism are also mounted on the column girder, and within the limiting rear fraction of chassis 27. As shown, a horizontal-drive electri motor 52 is mounted above reduction-gear means 53, having an output shaft 54 directly over the rear shaft 31', for roller 32 and its sprocket connection to chain 33. a short sprocket-chain 55 couples the shafts 31'–54, and adjustable tensioning of this coupling is suggested at 56.

It will be noted that all parts of the drive mechanisms are readily accommodated within what may be termed the lower half of the column and yet within the relatively short rearend offset of the lower chassis 27, thus facilitating direct maintenance access and entailing no limitation on the rearward extent of the carriage profile. Stated in other words, the longitudinal distance $L_1$ (FIG. 2) to which the carriage extends rearwardly of a container 10 on elevator 26 is relatively small and in the order of magnitude of a container width $L_2$, or of the elevator loading dimension $L_3$ which embraces guide rails 57–57' for lateral transfer of container 10 to and from the elevator platform.

In storage and retrieval systems of the character indicated wherein overall longitudinal space is not particularly large, e.g., a rail 20 of length up to 12 or 15 feet, the rearward offset of shaft 31' can be made relatively short, in order to reduce the dead space $L_1$ as much as the size and mounting of drives 50–51 and 52–53 will permit. In that circumstance, I provide vertical-stabilizing action for the carriage 25 through a pair of tensed cables 59–60, as best seen in FIG. 1. As shown, both cables are firmly rooted to the storage framework, and they pass over idler pulleys on an upper-chassis stud pin 61 and on a lower-chassis stud pin 62. Specifically, cable 59 is anchored at the lower rear end of the frame, via a pulley 63 and turn-buckle 64 to frame members 14–16, pulley 63 being positioned to define a lower strictly longitudinal course of cable 59, between pulleys at 63–62; cable 59 rises thence alongside the column channel 37 to the outer pulley at 61, for alignment of an upper strictly longitudinal course of cable 59 to an upper fixed front frame reference, schematically suggested by a heavy arrow at the break of this upper course in FIG. 1. In similar fashion, the second cable 60 is anchored at the upper rear end of the frame, via a pulley 65 and turnbuckle 66 to frame members 15–16, pulley 65 being positioned to define a strictly longitudinal course of cable 60, between pulleys at 65–61; cable 60 thence descends alongside the column channel 37 (and cable 59) to the inner pulley at 62, for alignment of a lower strictly longitudinal course of cable 60 to a lower fixed front frame reference, schematically suggested by a heavy arrow at the break of this lower course in FIG. 1.

In practice, it is found that, as long as the overall length of the system, e.g., rail 20, is not great enough to make stretch of cables 59–60 a deleterious factor, these cables need only be tensed sufficiently to eliminate slack, and they provide highly satisfactory and positive vertically stabilizing reaction against inertial overturning moments, during the most rapid accelerating and decelerating functions of carriage 25, and regardless of the magnitude or vertical elevation of the load on the elevator 26. This is accomplished for the described case wherein sole reliance is placed on the two rolls 32–32' of the lower chassis, for all drive and support functions, i.e., no reliance is placed on the upper rail 21 for any drive or vertical-reaction force, as has heretofore been considered necessary, for example, in said Castaldi patent.

The described structural arrangement will be seen to meet all stated objects, providing such simplicity, ruggedness and economy of space as to assure prolonged trouble-free operation and ready maintenance accessibility, for the indicated objective of serving relatively small office-storage purposes. For example, the lateral width W of the carriage frame may be sufficiently small compared to the spacing S between matrix-access planes 11–12 and 18–19, to permit a maintenance man to pass between a channel 37 (37') and the adjacent storage matrix (the elevator being in a sufficiently raised position, or in its bottom position); once past the carriage, maintenance personnel have easy reach to all drive mechanisms, without any need to climb. This clearance between carriage 25 and a adjacent matrix is also useful in accommodation of wide ribbons of flexible multiple-conductor cable which carry control and excitation potentials used in automated operation of the carriage 25; no attempt has been made to show such cables in the drawings, but a broken end connection of one of them is shown at 67, fastened to a laterally offset terminal bracket 68 on channel 37 (FIG. 1).

In a typical use of the invention, file boxes 10 of full file-cabinet size, e.g., 30 inches long and with end-wall (13) dimensions appropriate to business-letter or legal-file size, as desired, a two-matrix system may be served by the single monorail carriage 25, within a 8.2 foot wide "dead" storage room; length of the rail 20 and matrices served thereby is appropriate to the particular office-storage needs, and a single door in the narrow-dimension wall of the room will meet all access requirements, it being understood that the retrieval mechanism (i.e., programmed coordination of horizontal and vertical drives) will always bring a retrieved container to a forward location, for examination of contents or for removal, all as more fully set forth in said Castaldi patent.

While the invention has been described in detail for the preferred form shown, it will be understood that modifications may be made without departing from the spirit and scope of the invention.

What is claimed is:

1. A storage and retrieval system adapted for accommodation in a limited interior rectangular prismatic space with access at only one longitudinal end, comprising a rectangular prismatic framework having two opposed two-dimensional matrices of storage-compartment supports each of which is horizontally open at one of two laterally spaced parallel common vertical access planes, a first longitudinally extending rail parallel to and centrally offset from and between said planes along a lower horizontal alignment, a second longitudinally extending rail parallel to said first rail along an upper horizontal alignment, the vertical spacing of said rails spanning the vertical dimension of said matrix and the horizontal length of said rails spanning the horizontal dimension of said matrix; a carriage comprising a longitudinally elongated rectangular chassis including two longitudinally spaced support rolls including peripherally continuous treads of urethane material riding said first rail and sustaining the full weight of said carriage, front and rear shafts journaled in said chassis and fixed to said rolls, drive means on each of said shafts; lateral guide means depending from said chassis and having guided engagement with opposite lateral sides of said first rail at longitudinally spaced chassis locations, a single vertical column fixed to said chassis at a location longitudinally between said rolls and rearward of the longitudinal center of said chassis; a tensed stabilizing-cable system for vertically stabilizing said column in the presence of horizontal-drive acceleration, said system connecting upper and lower parts of said carriage with corresponding upper and lower parts of said framework, the portions of cable length extending between said carriage and frame being horizontal and parallel to said rails; lateral guide means carried at the upper end of said column and having guided engagement with opposite lateral sides of said second rail, such lateral engagement being the only running carriage engagement with said second rail, the lateral width of said column and carriage being substantially less than the space between said planes to the extent that maintenance-personnel access exists in the space between said column and an adjacent matrix, vertical elevator guide means on said column, an elevator guided by said elevator guide means and including an elevator platform projecting forwardly of said column and laterally into proximity with said planes, load-handling means on said elevator platform for transferring an article relative to said platform and one of said matrices; elevator-drive means mounted on the rear side of said column, said elevator-drive means comprising vertically spaced idler sprockets at the upper and lower ends of said column, an electric motor and reduction gearing with a drive-sprocket output, an endless chain over said idler and drive sprockets, and an elevator connection to said chain, said reduction gearing being at such a high ratio that said elevator is self-braked by the action of said gearing when said motor is not driven; and carriage-drive means mounted to the rear of said column and comprising an electric motor and reduction gearing positioned near and over said rear shaft, means connecting said rear shaft to the output of said reduction gearing, and means connecting said shafts for synchronized rotation of said rolls.

2. The system of claim 1, in which said lateral guide means comprises longitudinally spaced pairs of rolls engaging opposite lateral sides of said first rail at both front and rear ends of said chassis, said guide means at the upper end of said column comprising an upper elongated rectangular chassis, and longitudinally spaced pairs of rolls engaging opposite lateral sides of said second rail at both front and rear ends.

* * * * *